US008069867B2

(12) United States Patent
Turner et al.

(10) Patent No.: US 8,069,867 B2
(45) Date of Patent: Dec. 6, 2011

(54) CAR WASH ARCH

(75) Inventors: Barry S. Turner, Novi, MI (US); Adam Armstrong, Jackson, MI (US); Thomas E. Weyandt, Northville, MI (US)

(73) Assignee: Belanger, Inc., Northville, MI (US)

( * ) Notice: Subject to any disclaimer, the term of this patent is extended or adjusted under 35 U.S.C. 154(b) by 358 days.

(21) Appl. No.: 12/414,863

(22) Filed: Mar. 31, 2009

(65) Prior Publication Data
US 2010/0243007 A1    Sep. 30, 2010

(51) Int. Cl.
B08B 3/00     (2006.01)
B08B 3/04     (2006.01)
(52) U.S. Cl. ....................................................... 134/123
(58) Field of Classification Search .................... 134/123
See application file for complete search history.

(56) References Cited

U.S. PATENT DOCUMENTS

| 3,288,109 A | * | 11/1966 | Smith, Jr. et al. ............. 118/316 |
| 3,658,590 A | * | 4/1972 | Huebner et al. ................. 134/32 |
| D327,130 S | | 6/1992 | Belanger et al. |
| D375,389 S | | 11/1996 | Belanger et al. |
| 2007/0209129 A1 | | 9/2007 | Turner |
| 2010/0206961 A1 | | 8/2010 | Turner |

FOREIGN PATENT DOCUMENTS

WO    WO 2004072932 A1 *    8/2004

* cited by examiner

*Primary Examiner* — Michael Barr
*Assistant Examiner* — David Cormier
(74) *Attorney, Agent, or Firm* — Young Basile Hanion & MacFarlane PC

(57) ABSTRACT

A car wash arch of inverted U-shape with a centrally mounted pendant on the overhead horizontal section, the pendant being of such size and shape as to accommodate a logo or other indicia therein. Light tubes, preferably containing LEDs extend upwardly along the vertical sections of the arch, inwardly along the horizontal section of the arch and into the pendant so as to at least partially frame and illuminate the pendant. A fluid conduit feeding a system of nozzles can be mounted to the arch and supply car wash fluids to spray nozzles inwardly from the vertical and horizontal arch sections.

10 Claims, 4 Drawing Sheets

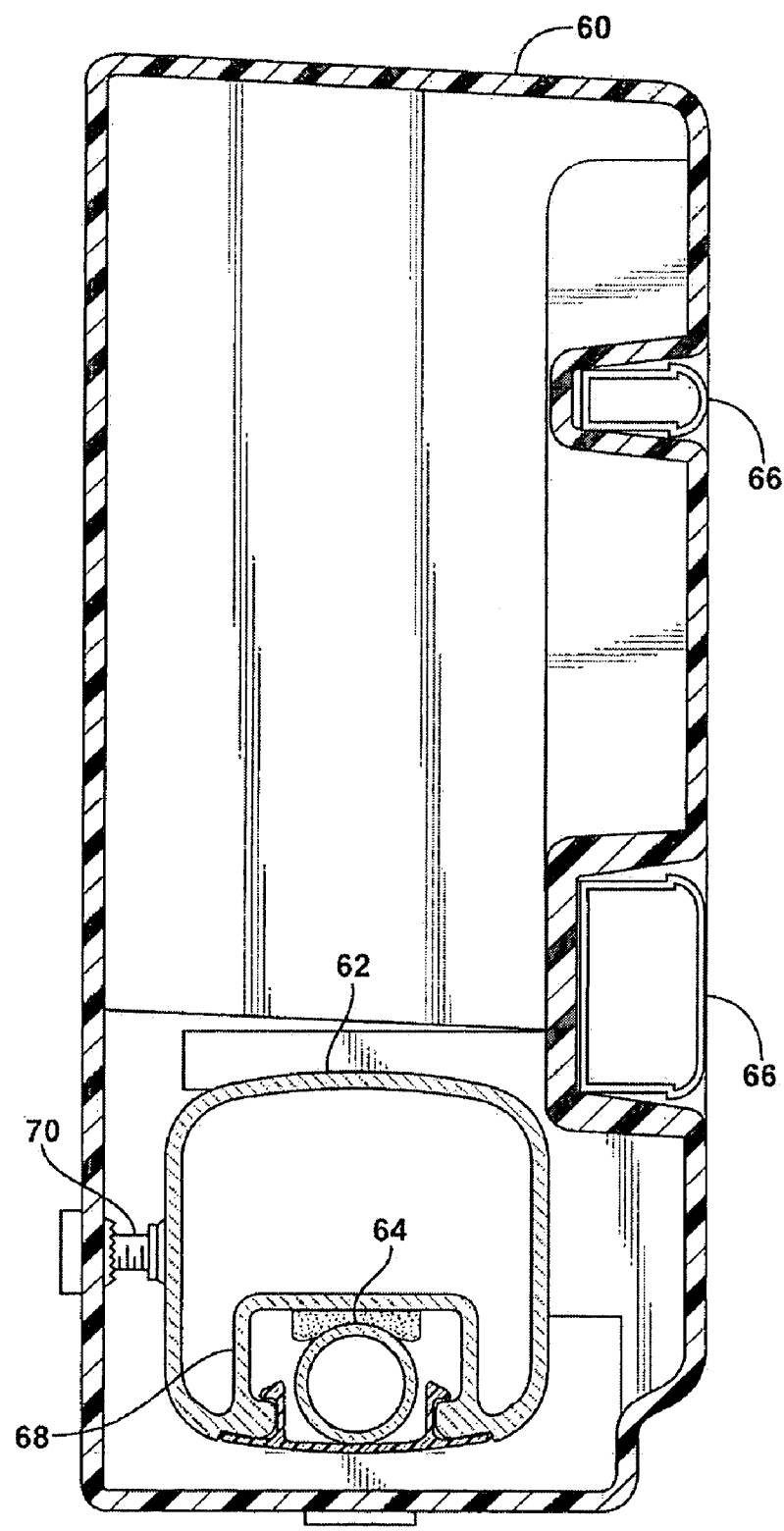

CAR WASH ARCH

FIELD OF THE INVENTION

This invention relates to car wash structures and more particularly to an arch-shaped structure with a pendant centered in the overhead horizontal section and having substantially continuous tubular light members mounted to and passing along the vertical and overhead sections of the arch on the approach side, wherein the light members extend into the pendant to frame and illuminate a logo or other indicia. The structure can carry a fluid conduit and nozzles for applying car wash fluids to vehicles.

It is common to use arch-shaped structures in conveyor car wash installations. An arch used to support a spray system is disclosed in the co-pending application Ser. No. 12/371,742 filed Feb. 16, 2009 and assigned to Belanger, Inc. of Northville, Mich., the disclosure of said co-pending application being incorporated herein by reference.

SUMMARY OF THE INVENTION

The present invention provides a car wash arch in the form of an inverted U-shaped structure of such size as to permit an automotive vehicle to pass through and under the arch. Mounted to the overhead section of the arch is a pendant; i.e., a structure of greater cross-sectional width than that of the arch section on which it is mounted and having a geometric shape with a center area capable of carrying a logo or other indicia. Tubular light members are mounted to and pass along the arch on the approach side. At lease one light member extends into the pendant to illuminate the arch during car wash operation.

In accordance with the invention, the pendant may assume any of a variety of geometric shapes including, but not limited to, rectangular, square, oval, sunburst and V-shaped.

In the preferred form, a fluid conduit is carried by the arch in a recessed and concealed fashion as described more fully in the co-pending application Ser. No. 12/371,742 as identified above. Nozzles are attached to the conduit and protrude from the interior surface of the arch to apply car wash fluid to vehicles passing through the arch.

BRIEF DESCRIPTION OF THE DRAWINGS

The description herein makes reference to the accompanying drawings wherein like reference numerals refer to like parts throughout the several views, and wherein;

FIG. 7 is a detailed drawing of a portion of the support structure showing how the pendant of FIG. 6 is attached thereto with the understanding that this attachment is essentially representative of the way all of the various pendant shapes attach to the support structure.

DETAILED DESCRIPTION OF THE ILLUSTRATIVE EMBODIMENT

Figure 1:
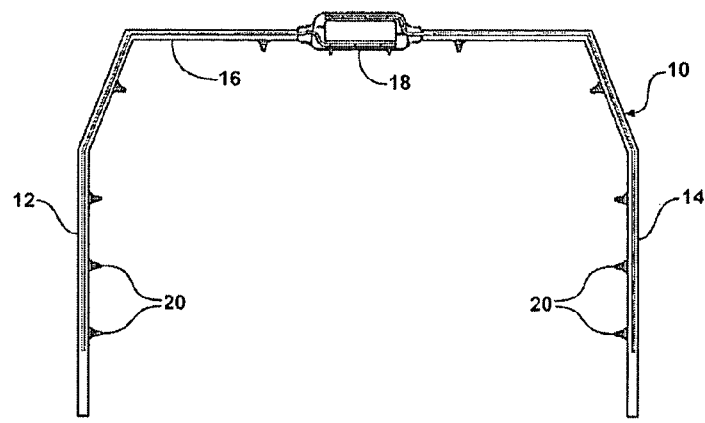
FIG. 1 is a view of an arch incorporating the invention and using a rectangular pendant.

FIG. 1 shows an arch 10 made up of upright parallel spaced-apart vertical sections 12, 14 joined at the top by a horizontal overhead section 16. The structure 10 is essentially made of welded aluminum and is essentially continuous. The shape shown is merely illustrative and may be more of a true arch or inverted U. A pendant 18 is mounted to the overhead horizontal section 16 so as to be essentially centered over the arch. Spray nozzles 20 protrude from the inside surfaces of the arch on both the vertical sections 12, 14 and the overhead horizontal section 16 to apply car wash fluids to vehicles being treated.

Figure 2:
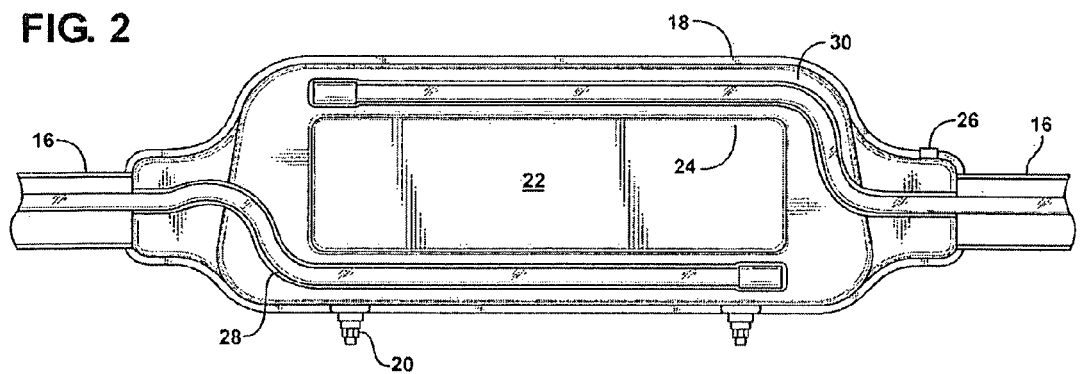
FIG. 2 is a detailed drawing of the rectangular pendant in the arch of FIG. 1.

FIG. 2 illustrates the pendant 18 in greater detail. It is essentially a hollow plastic shell. In this case, it is rectangular in shape and has a cross-sectional width which is greater than that of the arch structure 16 as shown. A flat central planar area 22 is bounded by a raised plastic molding 24 and is of such size and surface condition as to receive a logo and/or other indicia in painted or decal form. The pendant 18 is affixed to the structure 16 by means of clamps or other suitable fasteners diagrammatically illustrated at 26.

In accordance with the invention, clear tubular plastic lighting members 28, 30 extend up and along the verticals of the arch 12, 14, along the overhead horizontal section 16 and into the area of the pendant 18 so as to essentially straddle the center area 22 as shown in FIG. 2. The lighting members are essentially clear plastic tubes containing a plurality of closely spaced LEDs in any of various colors including white. The numbers 28, 30 create the appearance of "neon" lighting and are often referred to with this term. They are located so as to be seen by persons in vehicles approaching the arch 10.

Figure 3:
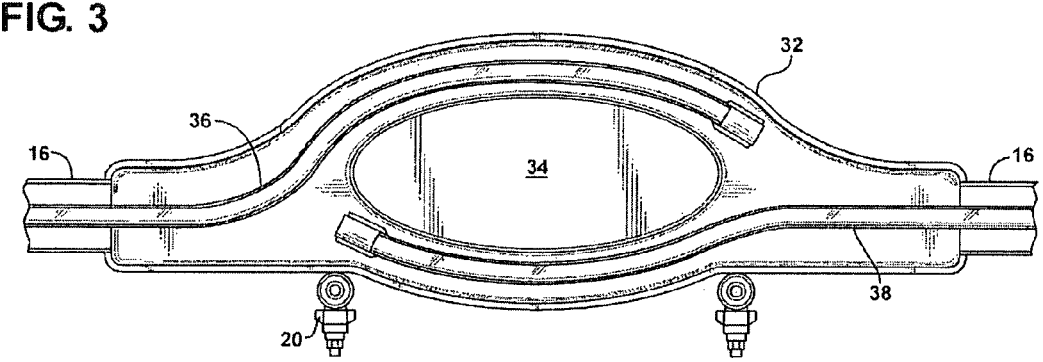
FIG. 3 is a detailed drawing of an alternative pendant which is oval in shape.

Referring now to FIG. 3, an alternative pendant 32 is shown having an oval shape in the central logo area 34. Again the area 34 is flat and of such surface condition as to receive paint and/or decals bearing logos and/or other indicia. Light tubes 36, 38 extend along the arch structure 16 and into the pendant 32 so as to straddle the central area 34. Nozzles 20 project from the bottom of the pendant 32 as shown.

In accordance with the invention, the pendants are typically made of molded plastic such as polyethylene and are fairly lightweight and essentially hollow in overall design.

Figure 4:
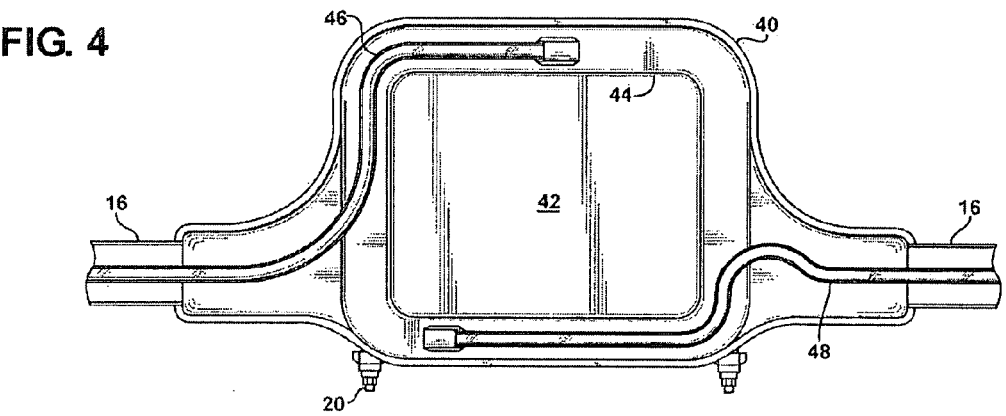
FIG. 4 is a detailed drawing of an alternative pendant which is square in shape.

Referring now to FIG. 4, a second alternative pendant 40 is shown to comprise a square center area 42 for receiving logos and/or indicia and having a molded plastic curbing 44 which frames the logo area. Light tubes 46, 48 extend inwardly from the structure 16 on the top and bottom area of the pendant 42 so as to straddle and illuminate same.

Figure 5:
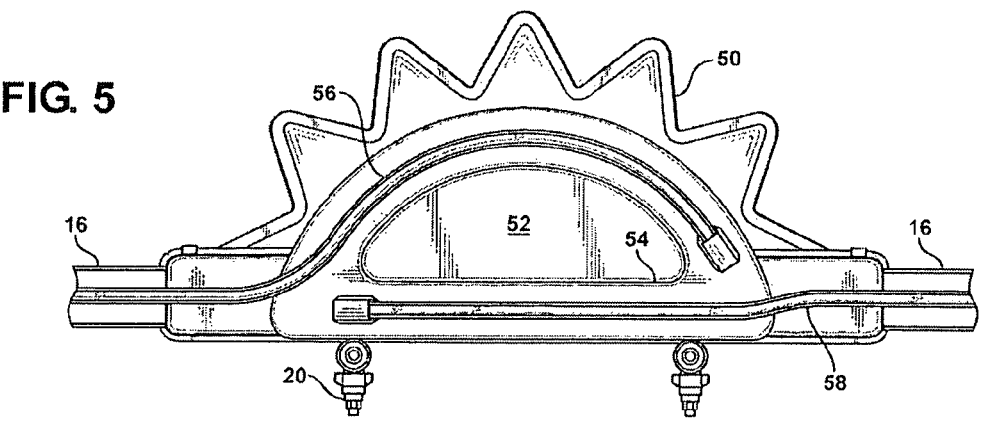
FIG. 5 is a detailed drawing of an alternative pendant which is of a sunburst shape.

Referring now to FIG. 5, a third alternative pendant 50 is shown of sunburst shape having a logo area 52 with a framing molding 54. Light tubes 56, 58 extend inwardly from and along the structure 16 from opposite sides and diverge to straddle the area 52 in the scanner shown.

Figure 6:
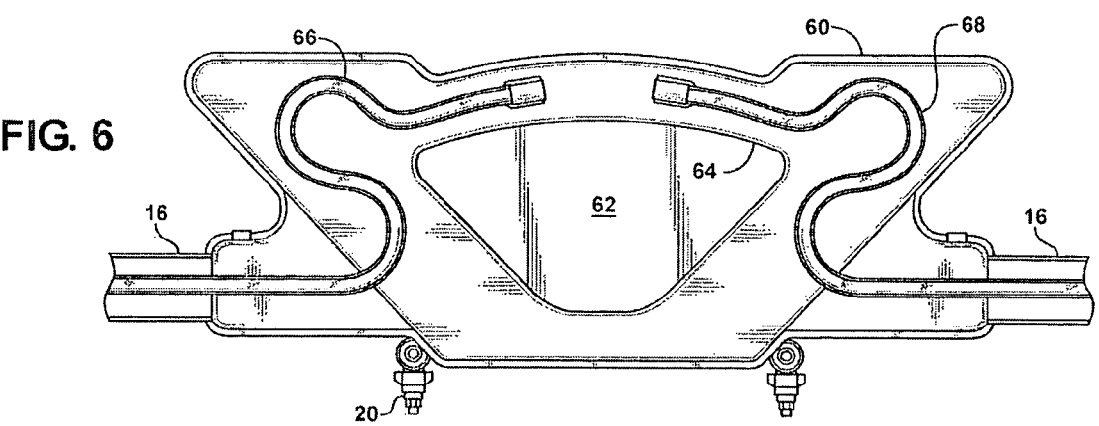
FIG. 6 is a detailed drawing of an alternative pendant which is essentially V-shaped.

Referring now to FIG. 6, another alternative pendant 60 is shown in essentially a V-shape with a central area 62 for receiving logos and other indicia within a molded framing element 64. Light tubes 66, 68 extend inwardly from the structure 16 so as to laterally bracket the area 62 and extend over the top of it as shown.

Referring now to FIG. 7, the details of the structure 16 as well as the pendant 60 are shown as representative of ail of the various alternative pendant shapes. The structure 16 in this case comprises an aluminum extrusion 62 which carries a continuous fluid conduit 64 to which the nozzles 20 are attached. The conduit 64 rests within an inwardly projecting recess 68 in the extrusion 62 which has a snap-on cover, as is more fully described in the aforementioned co-pending application. A fastener structure 70 is used to interconnect the pendant 60 to the structure 62.

It will be understood that the invention has been disclosed with reference to a series of representative embodiments and that various alternatives and modifications to the invention may be made by persons of ordinary skill in the art.

What is claimed is:

1. A car wash arch comprising:
   an inverted U-shaped structure of such size as to permit an automotive vehicle to pass therethrough; said structure including relatively narrow vertical arch sections and horizontal arch sections joined to said vertical sections;
   a pendant mounted between and joining said horizontal sections and having a geometric shape greater in cross-sectional dimension than said arch sections; and
   at least one tubular light member mounted to and passing continuously along and on an exterior surface of said vertical and horizontal sections and extending into said pendant to illuminate same; and
   wherein the car wash arch further comprises fluid conduit means extending along and attached to said arch structure, the combination further comprising nozzles extending from the fluid conduit so as to apply car wash fluid to vehicles passing through the arch.

2. A car wash arch as described in claim 1 wherein the pendant is rectangular.

3. A car wash arch as described in claim 1 wherein the pendant is square.

4. A car wash arch as described in claim 1 wherein the pendant is essentially V-shaped.

5. A car wash arch as described in claim 1 wherein the pendant is of an oval shape.

6. A car wash arch as described in claim 1 wherein the pendant has a sunburst shape.

7. A car wash arch as described in claim 1 wherein the pendant has a central area which is planar and adapted to receive a logo and/or other indicia therein.

8. A car wash arch as described in claim 1 wherein the tubular light member comprise LEDs.

9. A car wash arch as described in claim 1 wherein the nozzles are mounted to the fluid conduit along both vertical and overhead horizontal portions.

10. A car wash arch as defined in claim 1 wherein said tubular light member comprises a plurality of closely spaced LEDs.

* * * * *